(12) United States Patent
Blackburn

(10) Patent No.: US 7,178,830 B2
(45) Date of Patent: Feb. 20, 2007

(54) GAS GENERATOR

(75) Inventor: Jeffery S. Blackburn, Lake Orion, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 0 days.

(21) Appl. No.: 11/251,255

(22) Filed: Oct. 14, 2005

(65) Prior Publication Data

US 2006/0082112 A1 Apr. 20, 2006

(51) Int. Cl.
*B60R 21/26* (2006.01)
(52) U.S. Cl. ............... 280/736; 280/741; 280/742
(58) Field of Classification Search ........... 280/736, 280/737, 740, 741, 742; 102/530, 200, 202
See application file for complete search history.

(56) References Cited

U.S. PATENT DOCUMENTS

| | | | | |
|---|---|---|---|---|
| 4,005,876 | A | * | 2/1977 | Jorgensen et al. ........... 280/741 |
| 5,109,772 | A | * | 5/1992 | Cunningham et al. . 102/275.11 |
| 5,845,933 | A | * | 12/1998 | Walker et al. ............... 280/741 |
| 6,299,200 | B1 | * | 10/2001 | Bowers et al. ........... 280/730.2 |
| 6,328,336 | B1 | * | 12/2001 | Takahashi et al. .......... 280/737 |
| 2005/0212271 | A1 | * | 9/2005 | Adamini et al. ............ 280/736 |
| 2005/0234031 | A1 | * | 10/2005 | Schrimpf et al. ........... 514/183 |

* cited by examiner

*Primary Examiner*—Toan C To
(74) *Attorney, Agent, or Firm*—L.C. Begin & Associates, PLLC

(57) ABSTRACT

The present invention provides an inflator for an inflatable restraint system in an automobile. The inflator includes an elongate inflator body containing a baffle tube that cools gases as they are shunted therethrough upon gas generator activation.

5 Claims, 3 Drawing Sheets

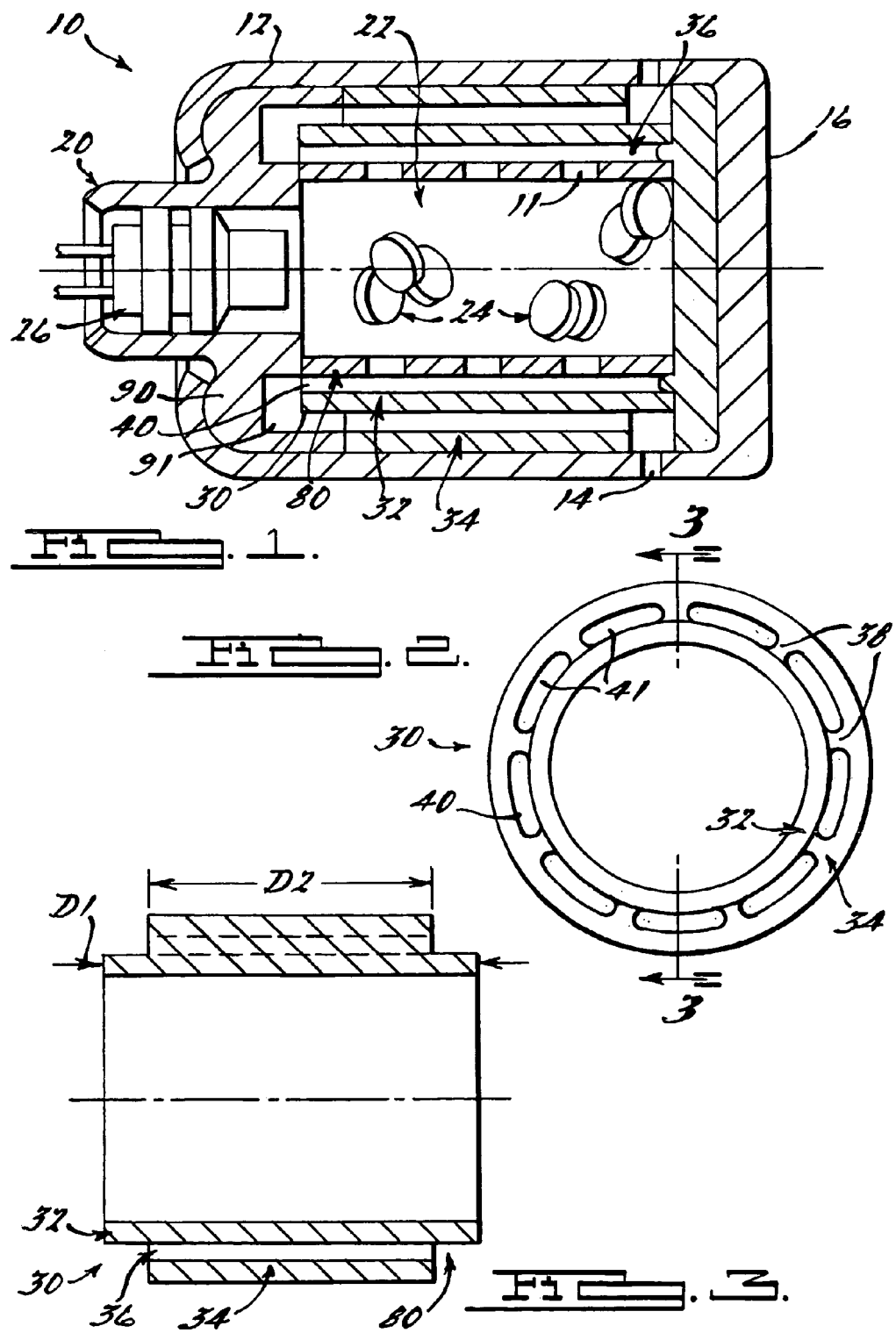

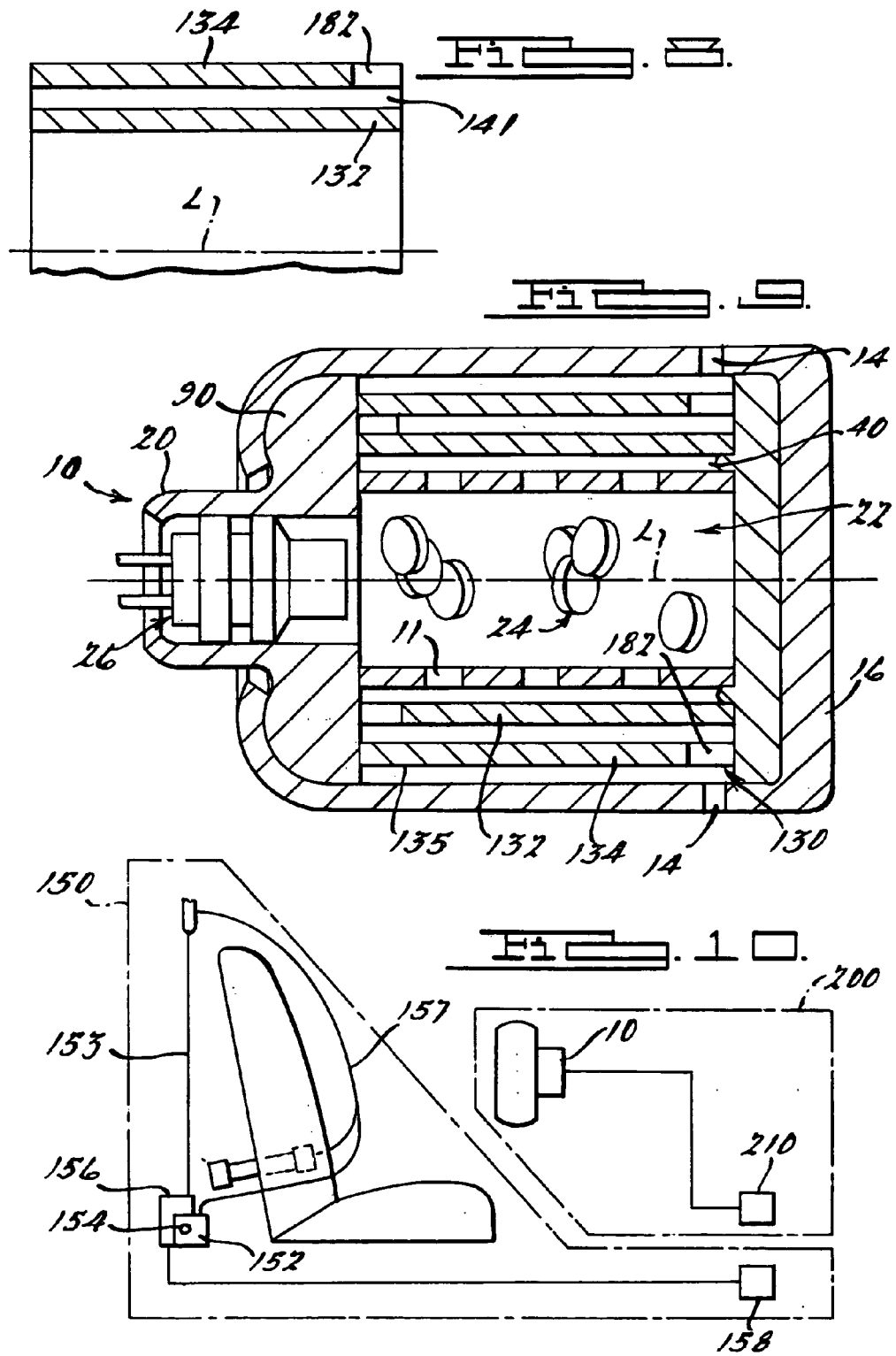

GAS GENERATOR

BACKGROUND OF THE INVENTION

The present invention relates generally to inflators for use in inflatable occupant restraint systems in motor vehicles and, more particularly, to baffle systems for replacing filters used in inflators to remove particulates from combustion gases and to cool the gases.

Installation of inflatable occupant restraint systems, such as airbags, as standard equipment in all new vehicles has intensified the search for smaller, lighter and less expensive restraint systems. Accordingly, since the inflator used in such systems tends to be the heaviest and most expensive component, there is a need for a lighter and less expensive inflator.

A typical inflator includes cylindrical steel or aluminum housing having a diameter and length related to the vehicle application and characteristics of a gas generant propellant contained therein. Inhalation by a vehicle occupant of particulates generated by propellant combustion during airbag activation can be hazardous. Thus, the inflator is generally provided with an internal, more rarely external, filter comprising one or more layers of steel screen of varying mesh and wire diameter. Gas produced upon combustion of the propellant passes through the filter before exiting the inflator. Particulate material, or slag, produced during combustion of the propellant in a conventional system is substantially removed as the gas passes through the filter. In addition, heat from combustion gases is transferred to the material of the filter as the gases flow through the filter. Thus, as well as filtering particulates from the gases, the filter acts to cool the combustion gases prior to dispersal into the airbag.

However, the wire mesh filter assembly increases the weight and expense of the inflator. In addition, due to factors such as spatial constraints within the gas generator/inflator and/or the type of gas generant used, combustion of the gas generant may be incomplete when combustion products exit the combustion chamber, resulting in flaming of the combustion products as the gases exit the combustion chamber and enter the wire mesh filter. The porous structure of the wire mesh filter may be unable to contain the flaming combustion products.

SUMMARY OF THE INVENTION

Various gas generant formulations have been developed in which the particulates resulting from combustion of the gas generant are substantially eliminated or significantly reduced. To solve the problems of reducing airbag inflator size, weight, cost and efficiency, the present invention obviates the need for a conventional filter by appropriate selection of a state of the art gas generant, or a smokeless gas generant if desired, and by incorporation of a baffle tube which cools the combustion gases prior to dispersal of the gases into an airbag. Obviating the need for a filter in an inflator allows the inflator to be simpler, lighter, less expensive and easier to manufacture.

The baffle tube includes an inner annulus and an outer annulus exterior of and spaced apart from the inner annulus to define a baffle between the inner and outer annuli. A plurality of walls extends between the inner annulus and the outer annulus to connect the outer annulus to the inner annulus, partitioning the baffle into a series of adjacent baffle chambers.

The baffle tube also provides an extended travel path for combustion gases flowing from the propellant chamber to discharge nozzles in the inflator, thereby allowing time for complete combustion of the gas generant in the inflator.

In another embodiment, the present invention provides orifices formed in the inner annulus, the outer annulus, and the walls. The walls and the orifices formed in the walls divide the baffle into a series of adjacent fluidly-communicating baffle chambers. Gases flow out of the inner annulus orifice, then sequentially through the fluidly-communication baffle chambers, the out of the baffle via the outer annulus orifice. This arrangement enables the degree of cooling of the gases to be controlled.

BRIEF DESCRIPTION OF THE DRAWINGS

FIG. 1 is cross-sectional side view of an inflator incorporating a baffle member in accordance with the present invention;

FIG. 2 is an end view of the baffle member incorporated into the inflator of FIG. 1;

FIG. 3 is a cross-sectional side view of the baffle member shown in FIGS. 1 and 2 taken along section line 3—3 of FIG. 2;

FIG. 8 is a partial cross-sectional view of the baffle tube shown in FIG. 4 taken along section line 8—8;

FIG. 9 is cross-sectional side view of an inflator incorporating the embodiment of the baffle member shown in FIG. 4; and FIG. 10 is a schematic representation of an exemplary vehicle occupant restraint system incorporating an inflator including a baffle tube in accordance with the present invention.

DETAILED DESCRIPTION

Figure 4:
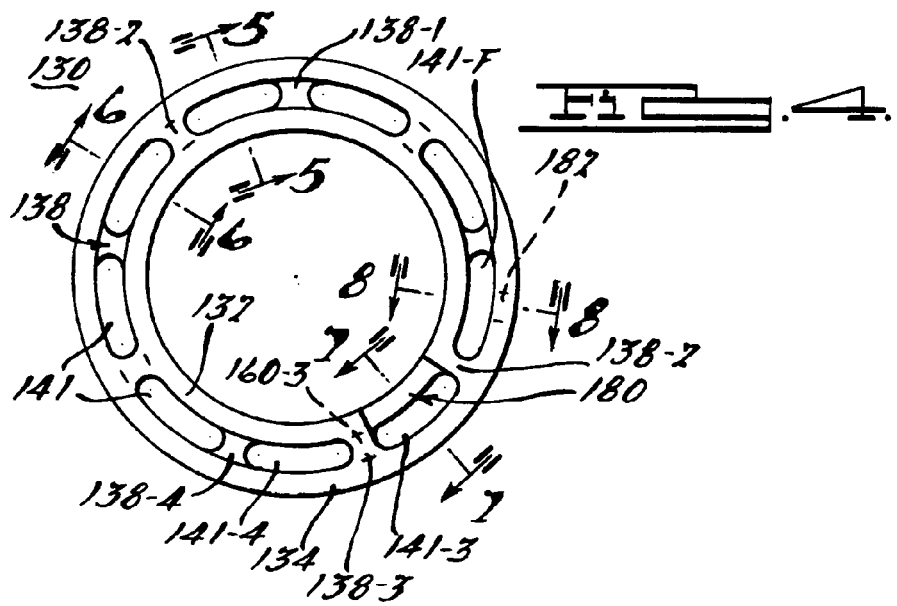
FIG. 4 is an end view of a second embodiment of a baffle member in accordance with the present invention.
Figure 5:
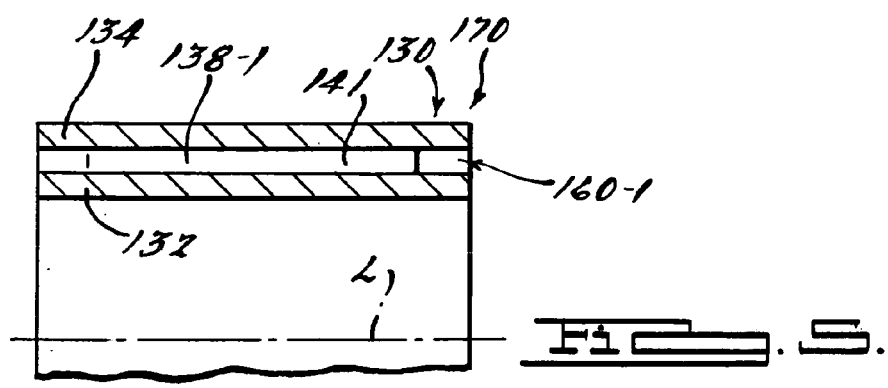
FIG. 5 is a partial cross-sectional view of the baffle tube shown in FIG. 4 taken along section line 5—5.

FIG. 1 shows a gas generator or inflator 10, in accordance with one embodiment of the invention. Inflator 10 includes a housing 12, for example, an aluminum forging. In this embodiment, housing 12 is provided with at least one gas discharge nozzle 14, or a plurality of gas discharge nozzles 14 arranged in at least one circumferentially and homolaterally extending row. Nozzles 14 may be circumferentially spaced apart substantially evenly. Housing 12 has an integral end closure 16 at one end and an end closure 20 at the opposite end that is crimped in place. A perforated propellant chamber 22 is centrally and longitudinally disposed within housing 12 for containment of propellant grains 24. Propellant chamber 22 has a longitudinal axis L.

The inside of the propellant chamber 22 may be provided with a burst foil covering perforations 11 of chamber 22 to facilitate pressure buildup and flame front propagation through propellant grains 24. End closure 20 accepts an electrical squib 26 in fluid communication with propellant chamber 22 facilitating electric ignition of propellant grains 24.

A cap 90 abuts an end portion of propellant chamber 22 and an end portion of a baffle tube 30 (described in greater detail below) to aid in positioning and securing chamber 22 and tube 30 within housing 12. Cap 90 is shaped so as to form an annular void 91 when seated with respect to chamber 22 and baffle tube 30. Void 91 allows the passage of combustion gases between plenum 40 and a baffle formed in baffle tube 30.

The propellant 24 residing in propellant chamber 22 may be any known smokeless gas generant composition useful for airbag application and is exemplified by, but not limited to, compositions and processes described in U.S. Pat. Nos. 5,872,329, 6,074,502, 6,287,400, 6,306,232 and 6,475,312 incorporated herein by reference. As used herein, the term "smokeless" should be generally understood to mean such propellants as are capable of combustion yielding at least about 90% gaseous products based on a total product mass; and, as a corollary, less than about 10% solid products based on a total product mass. It has been generally found that filters as used in other inflator designs can be eliminated by using compositions having the described combustion characteristics. Other suitable compositions are set forth in the U.S. patent application Ser. Nos. 10/407,300 and 60/369,775, incorporated herein by reference.

Referring again to FIGS. 1, 2, and 3, a baffle tube 30 encloses propellant chamber 22 in a radially spaced relationship to propellant chamber 22, thereby defining an annular plenum 40 extending between propellant chamber 22 and baffle tube 30. In the embodiment shown, baffle tube 30 is arranged concentrically with propellant chamber 22.

Baffle tube 30 has an inner annulus 32 and an outer annulus 34 exterior of and spaced apart from inner annulus 32 to define a baffle extending between the inner and outer annuli. Inner annulus 32 has a first length D1 and outer annulus 34 has a second length D2. First length D1 is greater than the second length D2. At least one wall 38 extends between inner annulus 32 and outer annulus 34 to connect the outer annulus to the inner annulus. In the embodiment shown, a plurality of circumferentially spaced-apart walls 38 is formed to connect outer annulus 34 to inner annulus 32. Also, as seen in FIG. 3, walls 38 are coextensive with a length D2 of outer annulus 34. In addition, as shown in FIG. 2, walls 38 partition baffle tube 30 into a series of parallel baffle chambers 41 extending along a length D2 of baffle tube 30 between inner annulus 32 and outer annulus 34.

In the embodiment shown in FIGS. 1–3, baffle tube 30 is extruded from an aluminum alloy, although other, alternative materials and fabrication methods are also contemplated. Propellant chamber 22 and baffle tube 30 each have a substantially cylindrical cross-section. However, a wide variety of alternative cross-sectional shapes may be used in accordance with the design criteria and spatial constraints relating to a particular application. For example, propellant chamber 22 and/or baffle tube 30 may have rectangular cross-sections.

In operation of the gas generator, and referring again to FIGS. 1–3, upon activation of squib 26, combustion gases exit propellant chamber 22 through perforations 11 in the propellant chamber. The gases proceed through plenum 40 along the circumference of propellant chamber 22 toward first end 80 of inner annulus 32. The gases pass out of plenum 40, transit annular void 91 extending between plenum 40 and baffle tube 30, and proceed into baffle chambers 41. The gases then flow through baffle chambers 41 along length D2 of outer annulus 34 to exit the inflator via discharge nozzles 14. Combustion gases exiting propellant chamber 22 are volumetrically expanded and cooled by passing along baffle tube 30, prior to entering an airbag via discharge nozzles 14. In addition, passage of the gases through baffle tube 30 allows extra time for full combustion of the gases prior to exiting the inflator, thereby minimizing flaming of the combustion products exiting discharge nozzles 14.

FIGS. 4–9 show another embodiment of the baffle tube of the present invention.

Referring to FIG. 4, a baffle tube 130 includes the same basic features set forth in the above description of baffle tube 30, including an inner annulus 132 and an outer annulus 134 exterior of and spaced apart from inner annulus 132 to define a baffle extending between the inner and outer annuli. In addition, a plurality of walls 138 extend between inner annulus 132 and outer annulus 134 to connect the outer annulus and the inner annulus. As shown in FIG. 4, walls 138 partition baffle tube 130 into a series of parallel baffle chambers 141 extending along the length of baffle tube 130 between inner annulus 132 and outer annulus 134. However, it may be seen from FIG. 9 that outer annulus 134 in this embodiment is substantially coextensive with inner annulus 132.

Figure 6:
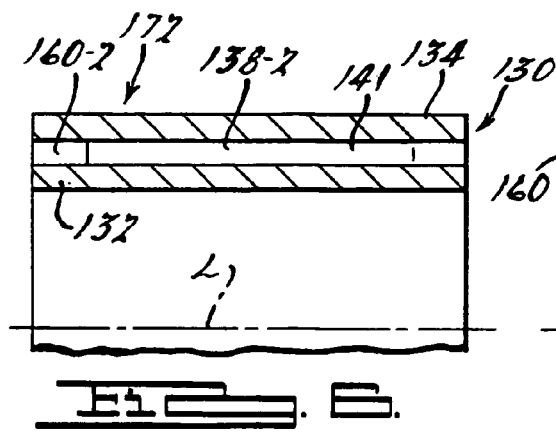
FIG. 6 is a partial cross-sectional view of the baffle tube shown in FIG. 4 taken along section line 6—6.

Also, referring to FIGS. 4–9, an orifice 160 is formed in each of walls 138 proximate an end of outer annulus 134 for passage of an inflation fluid therethrough. More specifically, referring to FIGS. 4 and 5, a first orifice 160-1 in a first wall 138-1 is formed proximate a first end 170 of outer annulus 134. Referring to FIGS. 4 and 6, a second orifice 160-2 is formed in a second wall 138-2 adjacent first wall 138-1. However, second orifice 160-2 is formed proximate a second end 172 of outer annulus 134, opposite the first end 170 of the outer annulus. This pattern of orifices formed in adjacent walls proximate alternating ends of outer annulus 134 is continued around the circumference of baffle tube 130. It may also be seen that orifices 160-1 and 160-2 enable fluid communication between adjacent baffle chambers 141.

Figure 7:
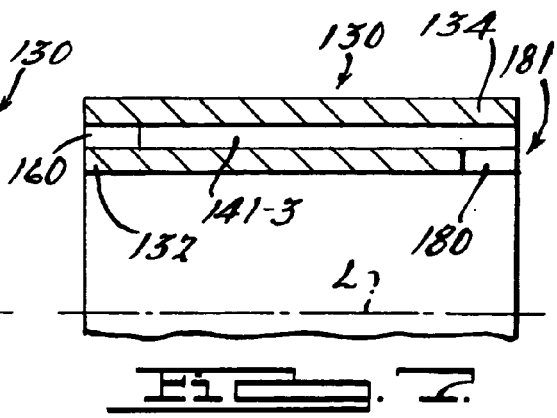
FIG. 7 is a partial cross-sectional view of the baffle tube shown in FIG. 4 taken along section line 7—7.

Referring to FIG. 7, in addition to orifices formed in walls 138, an orifice 180 is formed in inner annulus 132 proximate an end portion of the annulus to enable fluid communication between an interior of inner annulus 132 and an associated baffle chamber 141. Also, referring to FIG. 8, another orifice 182 is formed in outer annulus 134 proximate an end of the outer annulus to enable fluid communication between a baffle chamber 141 and an exterior of outer annulus 134.

Operation of the embodiment shown in FIGS. 4–9 is substantially the same as described above for baffle tube 30. Referring to FIGS. 4–9, upon activation of squib 26, combustion gases exit propellant chamber through perforations 11 in propellant chamber 22. The gases proceed through plenum 40 along the circumference of propellant chamber 22 toward first end 181 of inner annulus 132. However, in this embodiment, rather than passing out of plenum 40 along the entire circumference of propellant chamber 22, the gases exit plenum 40 via orifice 180 formed in first annulus 132 (FIGS. 4 and 7). Gases exiting orifice 180 flow into a baffle chamber 141-3 bounded by adjacent walls 138-2 and 138-3 and outer annulus 134, then proceed along the length of baffle chamber 141-3 until they reach orifice 160-3 formed in wall 138-3. At this point, the gases flow through orifice 160-3 into the next, adjacent baffle chamber 141-4. The gases then flow along the length of this baffle chamber until the orifice in the next wall 138-4 is reached. Thus, the gases flow sequentially from one baffle chamber to another around the circumference of inner annulus 134 until baffle chamber 141-F is reached. Gases then exit baffle tube 130 via orifice 182 (FIG. 8) formed in outer annulus 134. An outer plenum 135 fluidly communicates with orifice 182 to provide fluid communication with nozzles 14. The gases then exit the inflator via discharge nozzles 14, as previously described.

In sum, the embodiment shown in FIGS. 4–9 facilitates alternating and sequential fluid flow through each of the channels within the baffle plenum, whereby alternating longitudinal flow of the gas as it proceeds circumferentially about the baffle provides for slag deposition and excellent cooling of the gases.

As in the previously described embodiment, passage of the gases through the baffle chambers allows extra time for full combustion of the gases prior to exiting the inflator, thereby minimizing flaming of the combustion products exiting discharge nozzles 14. In addition, combustion gases exiting propellant chamber 22 are volumetrically expanded and cooled by passing along baffle chambers 141, prior to entering an airbag via discharge nozzles 14. In this embodiment, the gases are forced through a series of sequential baffle chambers 141 formed in baffle tube 130 to affect the residence time of combustion gases in the baffle tube. This is done to ensure that the gases reside in the baffle for a length of time sufficient to cool the gases to a temperature within a predetermined temperature range prior to the gases exiting inflator 10. The degree of gas cooling may be controlled by controlling the number of baffle passages 141 formed along baffle tube 130. In addition, more than one pathway through sequential fluidly-communicating passages may be formed by forming multiple exit orifices in inner annulus 132 and outer annulus 134, with an appropriate arrangement of walls 138 and orifices formed therein being positioned between an inner annulus orifice 180 and a respective outer annulus orifice 182.

Referring to FIG. 10, any of the baffle tube embodiments described herein may be incorporated into an inflator 10 used in an inflatable vehicle occupant protection system, such as an airbag assembly 200. Airbag assembly 200 includes at least one airbag 204 and an inflator 10 as described herein coupled to airbag 204 so as to enable fluid communication with an interior of the airbag. Airbag assembly 150 may also be in communication with a crash event sensor 210 including a known crash sensor algorithm that signals actuation of airbag assembly 200 via, for example, activation of airbag inflator 10 in the event of a collision.

Referring again to FIG. 10, airbag assembly 200 may also be incorporated into a broader, more comprehensive vehicle occupant restraint system 280 including additional elements such as a safety belt assembly 150. FIG. 10 shows a schematic diagram of one exemplary embodiment of such a restraint system. Safety belt assembly 150 includes a safety belt housing 152 and a safety belt 151 extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners which may be used in system 280 are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be understood that the preceding is merely a detailed description of various embodiments of this invention and that numerous changes to the disclosed embodiments can be made in accordance with the disclosure herein without departing from the spirit or scope of the invention. The scope of the invention should not therefore be limited by the preceding description, but should be given its broadest interpretation as stated in the claims appended hereto.

What is claimed is:

1. A gas generator comprising:
   an elongate body having a first end and a second end and at least one gas exit aperture;
   a perforate inner wall positioned within said body, said inner wall forming a gas generant chamber;
   a perforate baffle tube positioned within said body and outwardly of said perforate inner wall for cooling of gases formed upon activation of said gas generator, said baffle tube containing a first inner baffle wall and a second outer baffle wall structurally fixed to said first inner baffle wall thereby forming a first plenum between said perforate inner wall and said first inner baffle wall, said first plenum fluidly communicating with said gas generant chamber upon gas generator activation; and
   a second plenum formed between said inner baffle wall and said-outer baffle wall, said second plenum in fluid communication with said first plenum and said at least one gas exit aperture upon gas generator activation,
   wherein gases produced upon activation of said gas generator exit said gas generant chamber and traverse said first plenum to one end of said body, and then traverse said second plenum to the other end of said body, and then exit said gas generator through said at least one gas exit aperture.

2. The gas generator of claim 1 wherein said baffle tube is formed with a plurality of transverse walls substantially extending from one end of said body to the other end of said body, said transverse walls forming a plurality of channels within said baffle tube, said plurality of channels forming said second plenum and said plurality of channels fluidly communicating with said gas generant chamber and said first plenum.

3. An automotive restraint system comprising the gas generator of claim 1.

4. The gas generator of claim 1 wherein said baffle tube is formed with a plurality of transverse walls substantially extending from one end of said body to the other end of said body, said transverse walls structurally connecting said first and second baffle walls and forming a plurality of channels within said baffle tube, said plurality of channels forming said second plenum and said plurality of channels fluidly communicating with said gas generant chamber and said first plenum.

5. The gas generator of claim 1 wherein said first plenum comprises a plurality of longitudinal channels formed within said baffle tube, each of said channels in fluid communication with another of said channels wherein each channel is perforated to provide alternating longitudinal flow of gases as the gases traverse the channels.

* * * * *